(12) United States Patent
Lühn

(10) Patent No.: US 11,274,658 B2
(45) Date of Patent: Mar. 15, 2022

(54) WIND TURBINE TOWER SECTION

(71) Applicant: General Electric Company, Schenectady, NY (US)

(72) Inventor: Holger Lühn, Salzbergen (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/986,509

(22) Filed: Aug. 6, 2020

(65) Prior Publication Data
US 2021/0048001 A1    Feb. 18, 2021

(30) Foreign Application Priority Data

Aug. 12, 2019  (EP) ..................................... 19191267

(51) Int. Cl.
*F03D 13/20* (2016.01)
*E04H 12/08* (2006.01)
(52) U.S. Cl.
CPC ........... *F03D 13/20* (2016.05); *E04H 12/085* (2013.01); *F05B 2240/912* (2013.01)
(58) Field of Classification Search
CPC .............................. E04H 12/085; F03D 13/20
See application file for complete search history.

(56) References Cited

U.S. PATENT DOCUMENTS

| 3,219,370 | A | * | 11/1965 | Carl ...................... F16L 23/036 285/368 |
| 9,153,853 | B2 | * | 10/2015 | Lassiter .................. E04H 12/20 |
| 2011/0154757 | A1 | * | 6/2011 | Rosengren ............ E04H 12/085 52/296 |
| 2011/0154777 | A1 | | 6/2011 | Bagepalli |
| 2014/0230343 | A1 | | 8/2014 | Lam |
| 2015/0096240 | A1 | | 4/2015 | Arlaban Gabeiras et al. |
| 2021/0048001 | A1 | * | 2/2021 | Luhn ...................... F03D 13/20 |

FOREIGN PATENT DOCUMENTS

EP    2746580 A2   6/2014

OTHER PUBLICATIONS

European Search Report Corresponding to EP19191267 dated Feb. 18, 2020.

* cited by examiner

*Primary Examiner* — Andrew J Triggs
(74) *Attorney, Agent, or Firm* — Dority & Manning, P.A.

(57) ABSTRACT

A tower section 12 of a wind turbine is provided, the tower section 12 including an upper segment 100 that includes a lower flange 110; a lower segment 200 that includes an upper flange 210; a plurality of first bolt connections that include first bolts 310 and first nuts 320; a plurality of second bolt connections that include second bolts 410 and second nuts 420; wherein the first bolt connections and the second bolt connections connect the lower flange 110 to the upper flange 210; and wherein the first bolt 310 and the second bolts 410 have different axial positions with respect to the longitudinal axis of the tower section 12.

10 Claims, 5 Drawing Sheets

WIND TURBINE TOWER SECTION

FIELD

The present subject matter relates generally to wind turbines, and more particularly to connecting segments of a wind turbine tower.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

Larger wind turbines may provide the advantage of larger power generation capability. However, bigger wind turbines have corresponding structural requirements. Thus, there is a challenge to provide a corresponding structure. Accordingly, the present disclosure is directed to such a structure for a wind turbine, especially for the tower of a wind turbine.

BRIEF DESCRIPTION

Aspects and advantages of the invention will be set forth in part in the following description, or may be obvious from the description, or may be learned through practice of the invention.

In a first aspect, the present disclosure is directed to a tower section of a wind turbine, the tower section including an upper segment that includes a lower flange; a lower segment that includes an upper flange; a plurality of first bolt connections that include first bolts and first nuts; a plurality of second bolt connections that include second bolts and second nuts; wherein the first bolt connections and the second bolt connections connect the lower flange to the upper flange; and wherein the first bolts and the second bolts have different axial positions with respect to the longitudinal axis of the tower section.

In a second aspect, the present disclosure is directed to a method for connecting a lower segment to an upper segment of a tower section of a wind turbine, wherein the upper segment includes a lower flange and the lower segment includes an upper flange, the method includes: mounting first bolts and first nuts to build a plurality of first bolt connections connecting the lower flange to the upper flange, mounting second bolts and second nuts to build a plurality of second bolt connections connecting the lower flange to the upper flange, wherein the second bolt connections are mounted differently with respect to the first bolt connections.

In a third aspect, the present disclosure is directed to a tower section of a wind turbine, the tower section including an upper segment that includes a lower flange; a lower segment that includes an upper flange; a plurality of first bolt connections that include first bolts, first nuts and first spacers; and a plurality of second bolt connections that includes second bolts, second nuts and second spacers; wherein the first bolt connections and the second bolt connections connect the lower flange to the upper flange; and, wherein the first spacers are arranged on the first bolts above the lower flange; and wherein the second spacers are arranged on the second bolts below the upper flange.

These and other features, aspects and advantages of the present invention will be further supported and described with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
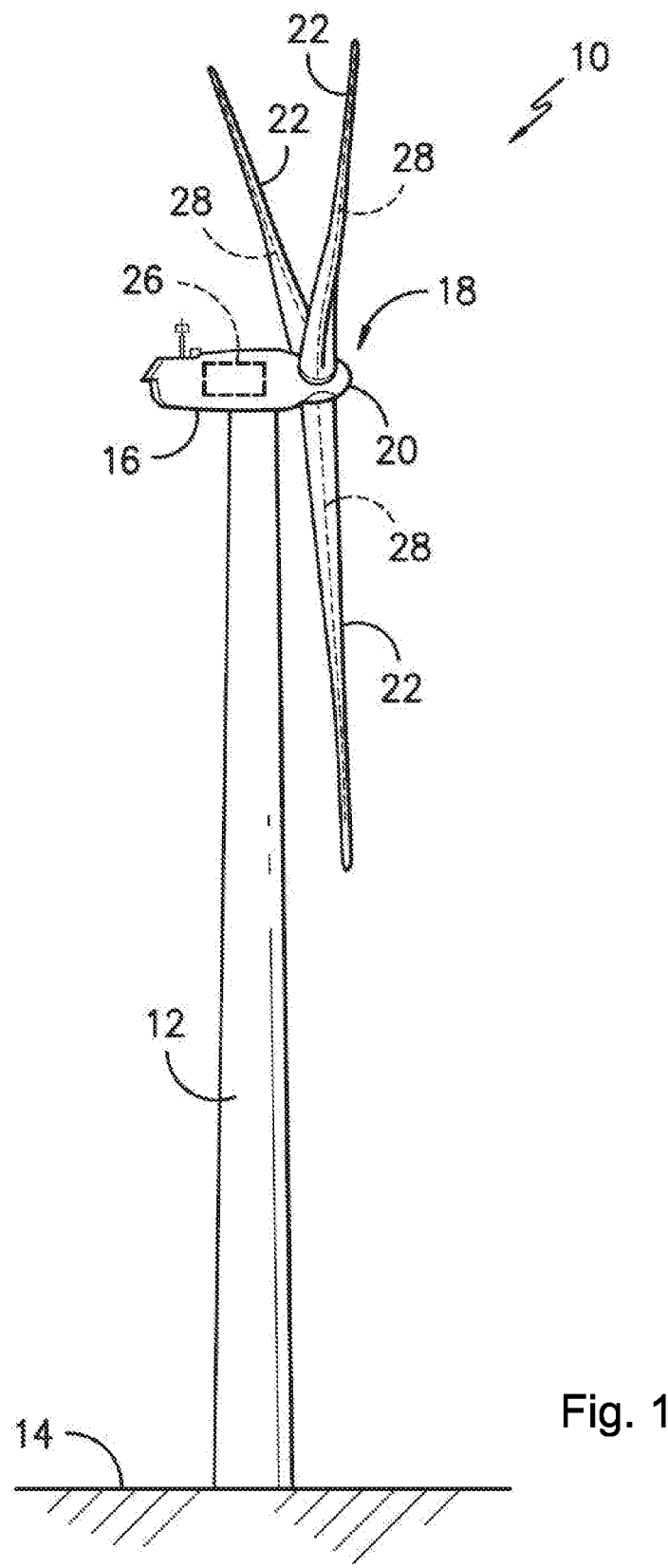
FIG. 1 illustrates a perspective view of a wind turbine.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates a perspective view of one embodiment of a wind turbine 10 according to the present disclosure. As shown, the wind turbine 10 generally includes a tower 12 extending from a support surface 14, a nacelle 16 mounted on the tower 12, and a rotor 18 coupled to the nacelle 16.

As shown in FIG. 1, the rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine 10. Further, the controller 26 may be communicatively coupled to any number of the components of the wind turbine 10 in order to control the components. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals.

Figure 2:
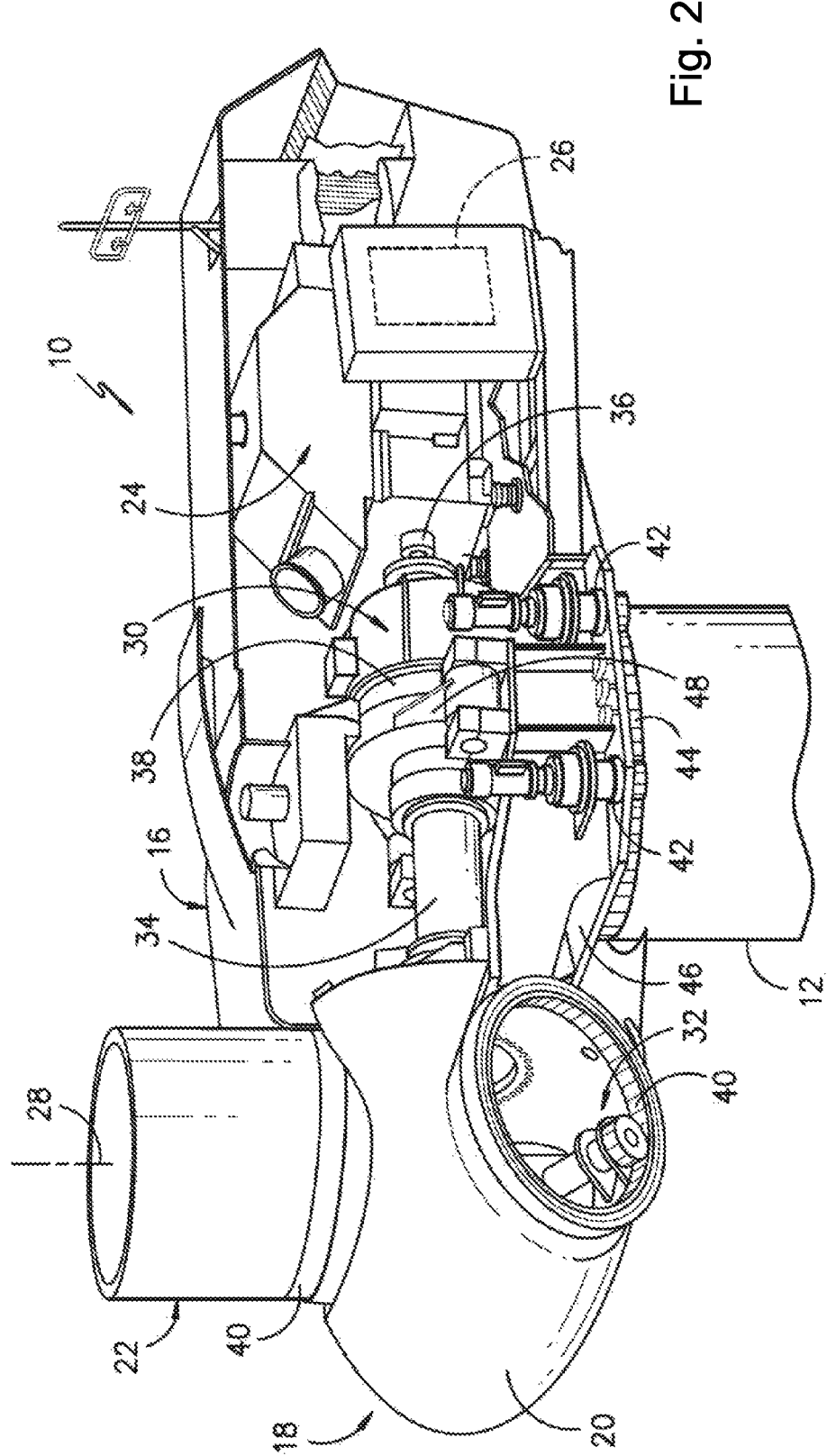
FIG. 2 illustrates a simplified, internal view of a nacelle of a wind turbine.

Referring now to FIG. 2, a simplified, internal view of one embodiment of the nacelle 16 of the wind turbine 10 shown in FIG. 1, particularly illustrating the drivetrain components thereof, is illustrated. More specifically, as shown, the generator 24 may be coupled to the rotor 18 for producing electrical power from the rotational energy generated by the rotor 18. The rotor 18 may be coupled to the main shaft 34, which is rotatable via a main bearing (not shown). The main shaft 34 may, in turn, be rotatably coupled to a gearbox output shaft 36 of the generator 24 through a gearbox 30. The gearbox 30 may include a gearbox housing 38 that is connected to the bedplate 46 by one or more torque arms 48. More specifically, in certain embodiments, the bedplate 46 may be a forged component in which the main bearing (not shown) is seated and through which the main shaft 34 extends. As is generally understood, the main shaft 34 provides a low speed, high torque input to the gearbox 30 in response to rotation of the rotor blades 22 and the hub 20. Thus, the gearbox 30 thus converts the low speed, high torque input to a high speed, low torque output to drive the gearbox output shaft 36 and thus, the generator 24.

Each rotor blade 22 may also include a pitch adjustment mechanism 32 configured to rotate each rotor blade 22 about its pitch axis 28 via a pitch bearing 40. Similarly, the wind turbine 10 may include one or more yaw drive mechanisms 42 communicatively coupled to the controller 26, with each yaw drive mechanism(s) 42 being configured to change the angle of the nacelle 16 relative to the wind (e.g., by engaging a yaw bearing 44 of the wind turbine 10).

Some embodiments relating to the present disclosure are described as follows. The upper flange and the lower flange may each include a plurality of bolt-holes for the plurality of first bolt connections and the plurality of second bolt connections. The upper flange and the lower flange may be made of metal. Each of the plurality of first bolt connections and the plurality of second bolt connections may include at least 30% of all bolt connections connecting the lower flange to the upper flange, respectively. The first bolt connections may be mounted in a first direction and the second bolt connections may be mounted in a second direction, wherein the first direction may be different from the second direction. A separation distance separating one of the plurality of first bolt connections and one of the plurality of second bolt connections may be less than a distance required for a tool to tighten the one of the plurality of first bolt connections and/or second bolt connections in a single plane. The first bolt connections may include first spacers and the second bolt connections may include second spacers, wherein the first spacers may be arranged on the first bolts above the lower flange, and wherein the second spacers may be arranged on the second bolts below the upper flange. The first spacers may have axial lengths at least equal to a thickness of a head portion of one of the second bolts, and the second spacers may have axial lengths at least equal to a thickness of a head portion of one of the first bolts. The lower flange may include first lower-flange-through-holes for the first bolt connections and second lower-flange-through-holes for the second bolt connections, wherein the first lower-flange-through-holes may be unthreaded and the second lower-flange-through-holes may be threaded. The upper flange may include first upper-flange-through-holes for the first bolt connections, and second upper-flange-through-holes for the second bolt connections, wherein the first upper-flange-through-holes may be threaded and the second upper-flange-through-holes may be unthreaded. The first bolts may be in a threaded engagement with the upper flange and the second bolts may be in a threaded engagement with the lower flange. The upper segment may be a part of a yaw gearing, and the lower segment may be a part of a foundation segment. A method according to some embodiments may include tightening the plurality of first bolt connections from a side above the lower flange, and tightening the plurality of the second bolt connections from a side below the upper flange. A method may include aligning a plurality of first lower-flange-through-holes with a plurality of first upper-flange-through-holes, and aligning a plurality of second upper-flange-through-holes with a plurality of second lower-flange-through-holes before mounting the plurality of first bolts and the plurality of second bolts, wherein the plurality of first lower-flange-through-holes and the plurality of second upper-flange-through-holes may be unthreaded, and the first upper-flange-through-holes and the second lower-flange-through-holes may be threaded. A method of mounting the plurality of first bolts and the plurality of first nuts may include mounting a plurality of first spacers on the plurality of first bolts from a side above the lower flange; and mounting the plurality of second bolts and the plurality of second nuts may include mounting a plurality of second spacers on the plurality of second bolts from a side below the upper flange.

Figure 3:
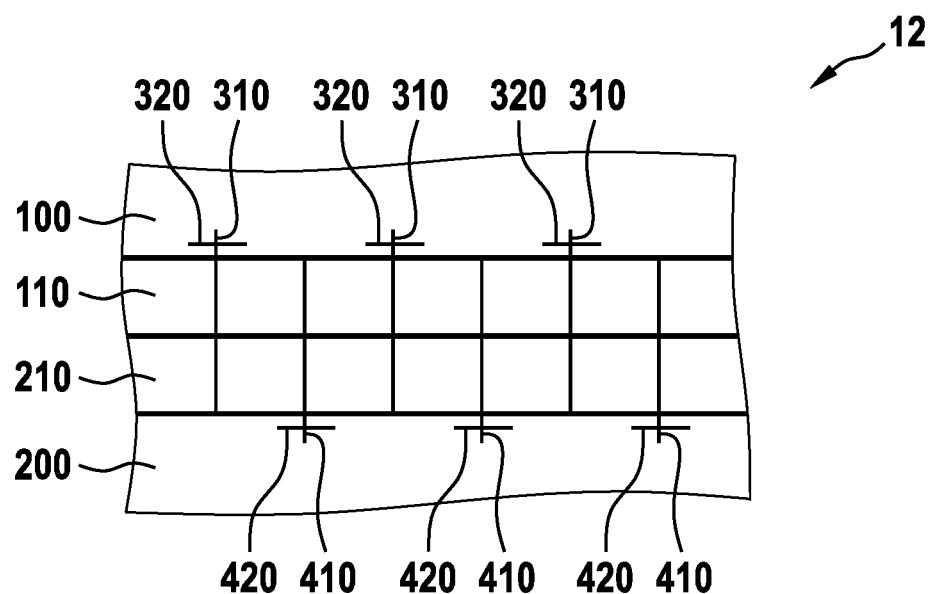
FIG. 3 illustrates a simplified side view representation of a part of a tower section of a wind turbine according to the present disclosure.

Referring now to FIG. 3, a simplified representation of a part of a wind turbine 10 is shown. In typical embodiments, the tower section 12 may include an upper segment 100 and a lower segment 200. The upper segment 100 may include a lower flange 110. The lower segment 200 may include an upper flange 210. The lower flange 110 may typically be connected to the upper flange 210 by a plurality of bolt connections. The bolt connections may include first and second bolt connections. Each of the bolt connection may include bolts and nuts. The first bolt connections may include first bolts 310 and first nuts 320. The second bolt connections may include second bolts 410 and second nuts 420. The first bolt connections may be mounted differently to the second bolt connections.

In some embodiments, the upper flange 210 and the lower flange 110 may each include a plurality of bolt-holes for the plurality of first bolt connections and second bolt connections. The lower flange 110 may include first lower-flange-through-holes 331 and/or second lower-flange-through-holes 432. Similarly, the upper flange 210 may include first upper-flange-through-holes 332 and/or second upper-flange-through-holes 431. The first lower-flange-through-holes 331 and/or first upper-flange-through-holes 332 may be for the first bolt connections and/or first bolts 310. Similarly, the second lower-flange-through-holes 432 and/or second upper-flange-through-holes 431 may be for the second bolt connections and/or second bolts 310.

In some further embodiments, the first bolts 310 may be fixed by first nuts 320 and/or the second bolts 410 may be fixed by second nuts 420. The first nuts 320 may be fixed on the first bolts 310 and/or fixed from an upper side of the lower flange 110 and/or the second nuts 420 may be fixed on the second bolts 410 and/or fixed from a lower side of the upper flange 210. An upper side of the lower flange 110 may be the same as a side above the lower flange 110. Similarly, a lower side of the upper flange 210 may be the same as a side below the upper flange 210. The first bolts 310 and/or second bolts 410 may be stud bolts, hex head bolts, tower bolts, hex head tower bolts and/or 12 point bolts. The first nuts 320 and/or second nuts 420 may be hex nuts and/or 12 point nuts.

In some embodiments, the upper flange 210 and the lower flange 110 may be made of metal, for example carbon steels, high strength low alloy steels, or corrosion resistant steels. The upper segment 100 may be a part of a yaw gearing. The lower segment 200 may be a part of a foundation segment. Each of the plurality of first bolt connections and the plurality of second bolt connections may include at least 20%, preferably at least 30%, more preferably at least 40%, or even more preferably at least 45% of all bolt connections connecting the lower flange 110 to the upper flange 210, respectively. In an example, the first bolt connections may represent 50% of the bolt connections and the second bolt connections may represent the other 50% of the bolt connections. The first bolt connections may be mounted in a first direction and the second bolt connections may be mounted in a second direction. The first direction may be different from the second direction. In some examples, the first direction may parallel and opposite from the second direction. In further examples, the first direction and/or second direction may be perpendicular to the plane of the lower flange 110 and/or upper flange 210. In some embodiments, the first bolts 310 and the second bolts 410 may have different axial positions with respect to the longitudinal axis of the tower section 12. An axial position may be understood as a position in a direction parallel to a central axis or a longitudinal axis of the tower section 12. In an example, the axial position of the first bolts 310 may be higher than the second bolts 410. In another example, the axial position of the first bolts 310 may be lower than the second bolts 410. The axial position might be defined by the upper end and/or the lower end of the respective bolt. Typically, the first bolts and the second bolts are identical and/or of identical length and/or identical diameter. In further embodiments, the first bolts and the second bolts might be different, e.g. with different threaded portions or different lengths or different diameters.

In yet further embodiments, a separation distance separating one of the plurality of first bolt connections from one of the plurality of second bolt connections may be less than a distance required for a tool 500 for tightening. The tool 500 may be used in a single plane. The single plane may be perpendicular the central axis of the one of plurality of first bolt connections and/or the one of plurality of second bolt connections. The single plane may be parallel to a surface of the lower flange 110, the upper flange 210 and/or interfacial plane between the lower flange 110 and the upper flange 210. The single plane may adjoin a surface of the lower flange 110 and/or the upper flange 210. The tool 500 may be for tightening the at least one of the plurality of first bolt connections and second bolts connections. The tool 500 used for tightening the first bolt connections and/or second bolt connections may include spanners and/or wrenches of a torque, socket, open, key, power, hydraulic, pipe, strap, mole, adjustable, box, ratchet, 6-point, hex, and/or 12-point type.

Figure 4:
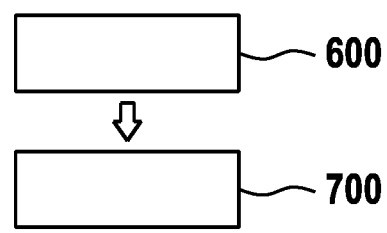
FIG. 4 illustrates a method of connecting tower segments of a wind turbine according to the present disclosure.

Referring now to FIG. 4, a method of connecting tower segments of a wind turbine is shown. In typical embodiments, there may be a method for connecting a lower segment with an upper segment 100 of a tower section of a wind turbine, wherein the upper segment may include a lower flange and the lower segment may include an upper flange. The method may include mounting 600 first bolts and first nuts to build a plurality of first bolt connections connecting the lower flange to the upper flange, and mounting 700 second bolts and second nuts to build a plurality of second bolt connections connecting the lower flange to the upper flange, wherein the second bolt connections are mounted differently with respect to the first bolt connections.

In some embodiments, the first nuts and/or second nuts may be mounted on the first bolts and/or second bolts respectively to build the plurality of first bolt connections and/or second bolt connections respectively.

In some embodiments, there may be a method of mounting the first bolt connections by tightening the first bolt connections from a first tightening side and mounting the second bolt connections by tightening the second bolt connections from a second tightening side. The first tightening side may be different from the second tightening side. The first tightening side may be opposite to the second tightening side.

For example, there may be a method of tightening 650 the plurality of first bolt connections from a side above the lower flange, and/or tightening 750 the plurality of the second bolt connections from a side below the upper flange.

Figure 5:
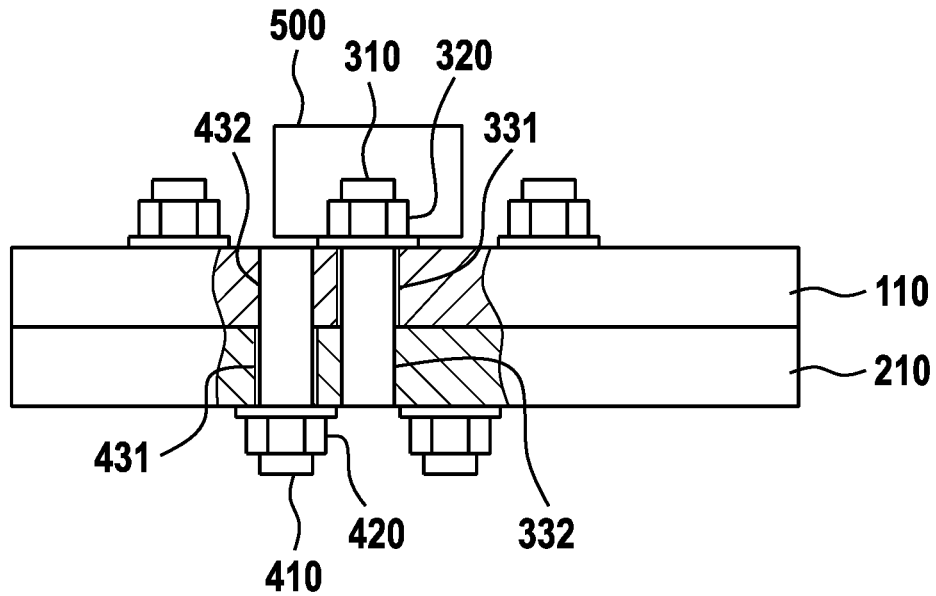
FIG. 5 illustrates a simplified side view representation of one embodiment of a part of a tower section of a wind turbine according to the present disclosure.

Referring now to FIG. 5, a simplified representation of one embodiment of a part of a tower section of a wind turbine is shown. In typical embodiments, the first and second bolt connections may be mounted in different directions. For example, the first bolts 310 may be mounted such that the first bolts 310 protrude from above the lower flange 110. Similarly, the second bolts 410 may be mounted such that the second bolts 410 protrude from below the upper flange 210. In another example, a part of a shank of each of the first bolts 310 may protrude from above the lower flange 110. Similarly, a part of a shank of each of the second bolts 410 may protrude from below the upper flange 210. In a typical example, each of a plurality of first nuts 320 may be mounted on each of the first bolts 310 from a side above the lower flange 110. Similarly, each of a plurality of second nuts 420 may be mounted on each of the second bolts 410 from a side below the upper flange 210.

In some embodiments, the shank of the first bolts 310 may either not protrude or not protrude substantially from below the upper flange 210. "Protrude substantially" may be such that the mounting of adjacent connections and/or the second bolt connections is not affected or changed by such protrusion. For example, the shank or a part of first bolts 310 may either not protrude or not protrude substantially on a side below the upper flange 210 such that the space for mounting and/or tightening adjacent connections and/or the second bolt connections is negatively affected e.g. reduced. In a particular example, the length or amount of protrusion of the shank or a part of the first bolts 310 below the lower surface of the upper flange 210 may be zero or less than either a thickness or an axial length of a washer for use in the second bolts connections. In some embodiments, the first bolts 310 may be stud bolts. Similarly, the first nuts 320 may be hex nuts or 12-point nuts.

Similarly, the shank of the second bolts 410 may either not protrude or not protrude substantially from above the lower flange 110. "Protrude substantially" may be such that the mounting of adjacent connections and/or the first bolt connections is not affected or changed by such protrusion. For example, the shank or a part of second bolts 410 may either not protrude or not protrude substantially on a side above the lower flange 110 such that the space for mounting and/or tightening adjacent connections and/or the first bolt connections is negatively affected e.g. reduced. In a particular example, the length or amount of protrusion of the shank or a part of the second bolts 410 above the upper surface of the lower flange 110 may be zero or less than either a thickness or an axial length of a washer for use in the first bolts connections. In some embodiments, the second bolts 410 may be stud bolts. Similarly, the second nuts 420 may be hex nuts or 12-point nuts.

In some embodiments, the first lower-flange-through-holes 331 may be different from the first upper-flange-through-holes 332. For example, the first lower-flange-through-holes 331 may have a different diameter, for example larger diameter/nominal diameter, than the first upper-flange-through-holes 332. The first lower-flange-through-holes 331 may be unthreaded and/or the first upper-flange-through-holes 332 may be threaded. In further embodiments, the first bolts 310 may be in an unthreaded engagement with the lower flange 110 and/or threaded engagement with the upper flange 210. The first bolts 310 may configured to be in an unthreaded engagement with first lower-flange-through-holes 331 and/or configured to be in a threaded engagement with the first upper-flange-through-holes 332. The first lower-flange-through-holes 331 may be configured to be aligned with the first upper-flange-through-holes 332.

Similarly, the second upper-flange-through-holes 431 may be different from the second lower-flange-through-holes 432. For example, the second upper-flange-through-holes 431 may have a different diameter, for example larger diameter/nominal diameter, than the second lower-flange-through-holes 432. The second upper-flange-through-holes 431 may be unthreaded and/or the second lower-flange-through-holes 432 may be threaded. In further embodiments, the second bolts 410 may be configured to be in an unthreaded engagement with the upper flange 210 and/or configured to be in a threaded engagement with the lower flange 110. The second bolts 310 may be configured to be in an unthreaded engagement with second upper-flange-through-holes 431 and/or configured to be in a threaded engagement with the second lower-flange-through-holes 432. The second upper-flange-through-holes 431 may be configured to be aligned with the second lower-flange-through-holes 432.

Figure 6:
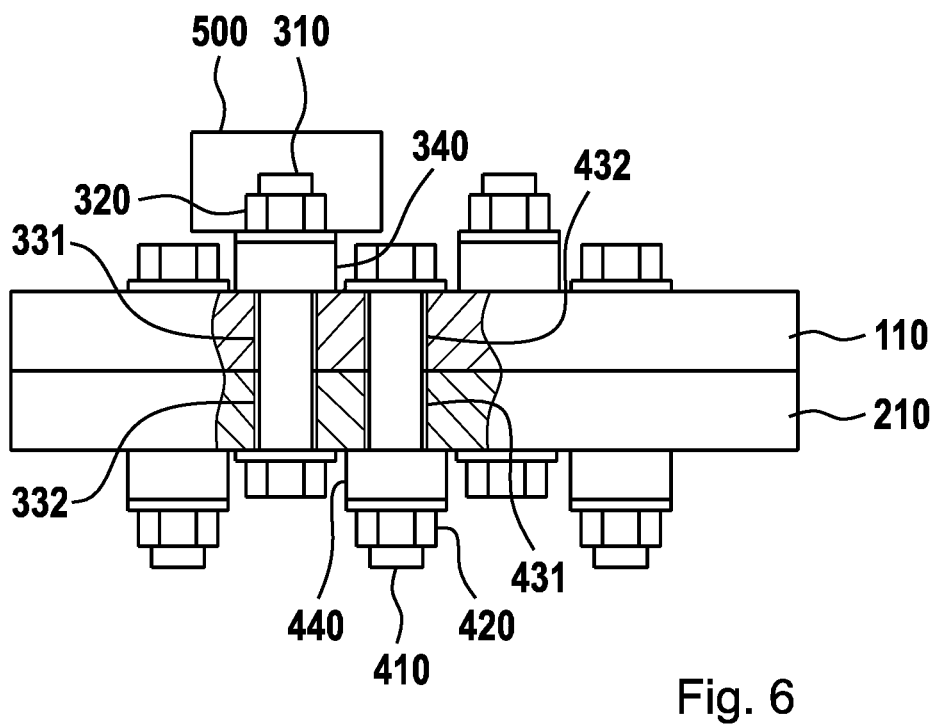
FIG. 6 illustrates a simplified side view representation of one embodiment of a part of a tower section of a wind turbine according to the present disclosure.

Referring now to FIG. 6, a simplified representation of one embodiment of a part of a tower section of a wind turbine is shown. In typical embodiments, the first lower-flange-through-holes 331, first upper-flange-through-holes 332, second upper-flange-through-holes 431, and/or second lower-flange-through-holes 432 may be of the same diameter and/or unthreaded. Similar to some embodiments as shown in FIG. 5, the first lower-flange-through-holes 331 and/or the second upper-flange-through-holes 431 may be configured to be aligned with the first upper-flange-through-holes 332 and/or second lower-flange-through-holes 432.

In some embodiments, the first bolts 310 and/or second bolts 410 may be tower bolts, hex head bolts, and/or 12-point bolts. Correspondingly, the first nuts 320 and/or second nuts 420 may be hex nuts and/or 12-point nuts. The first bolt connections and/or second bolt connections may include first spacers 340 and/or second spacers 440 respectively. The first spacers 340 may be arranged on the first bolts 310 above the lower flange 110, and/or the second spacers 440 may be arranged on the second bolts 410 below the upper flange 210. The first spacers 340 and/or the second spacers 440 may have an axial length which is equal to or greater than a thickness and/or axial length of a head portion of one of the first bolts 310, a head portion of one of the second bolts, at least one of the first nuts 320, at least one of the second nuts 420. Typically, the thickness of the first spacers 340 and/or the second spacers 440 is greater than at least two times the thickness of a washer of the respective bolt connection. The head portion of a bolt might refer to a part of the bolt with the largest diameter.

Figure 7:
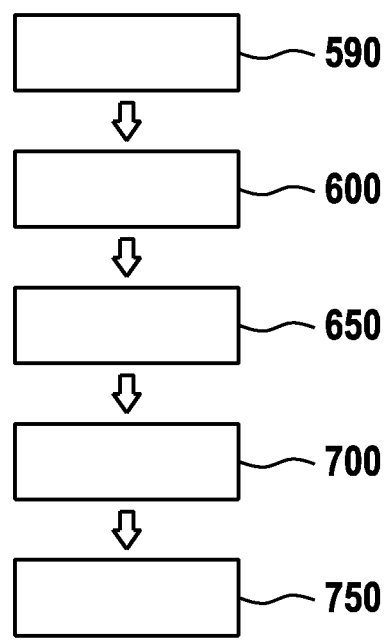
FIG. 7 illustrates a method of one embodiment of connecting tower segments of a wind turbine according to the present disclosure.

Referring now to FIG. 7, a method of one embodiment of connecting tower segments of a wind turbine is shown. The method may include aligning 590 the first lower-flange-through-holes 331 with the first upper-flange-through-holes 332, for example by aligning the central axis of the first lower-flange-through-holes 331 and the first upper-flange-through-holes 332. Similarly, the method may include aligning the second upper-flange-through-holes 431 with the second lower-flange-through-holes 432, for example by aligning the central axis of the second upper-flange-through-holes 431 and the second lower-flange-through-holes 432. A method may include aligning 590 before mounting 600, 700 the plurality of first bolts 310 and the plurality of second bolts 410.

The plurality of first lower-flange-through-holes 331 and the plurality of second upper-flange-through-holes 431 may be unthreaded. The first upper-flange-through-holes 332 and the second lower-flange-through-holes 432 may be threaded. For example, each of the unthreaded first lower-flange-through-holes 331 may be aligned with each of the respective threaded first upper-flange-through-holes 332.

In an example, each of the first bolts 310, for example stud bolts, may be mounted in the respective aligned first lower-flange-through-holes 331 and first upper-flange-through-holes 332, thereby connecting the lower flange 110 with the upper flange 210. Each of the first nuts 320 may be mounted on each of the first bolts 310 from above the lower flange 110. The first nuts 320 may be tightened 650 from above the lower flange 110.

Similarly, each of the unthreaded second upper-flange-through-holes 431 may be aligned with each of the threaded second lower-flange-through-holes 432. Each of the second bolts 410, for example stud bolts, may be mounted in the respective aligned second upper-flange-through-holes 431 and second lower-flange-through-holes 432, thereby connecting the lower flange 110 with the upper flange 210. Each of the second nuts 420 may be mounted on each of the second bolts 410 from below the upper flange 210, and the second nuts 420 may be tightened 750 from below the upper flange 210.

FIG. 7 shows a typical method according to embodiments described herein. The steps shown in FIG. 7 may be interchangeable in their order typically except the step of aligning 590 which may occur before the other steps shown in FIG. 7. For example, mounting 700 the second bolts and second nuts may be after or before tightening 650 the first nuts/first bolt connections. Similarly mounting 700 the second bolts and second nuts may be after or before mounting 600 the first bolts and first nuts. Similarly, tightening 750 the second nuts/second bolt connections may be after or before tightening first nuts/first bolt connections.

A method may include mounting each of the plurality of first spacers on each of the plurality of first bolts from a first spacers side and/or a side above the lower flange. Similarly, there may be a method of mounting each of the plurality of second spacers on each of the plurality of second bolts from a second spacers side and/or a side below the upper flange. The first spacers side may be a different side or opposite side from the second spacers side. The first and/or second spacers side may be the same side as the first and/or second tightening side respectively. Similarly, the second spacers side may be the same side as the second tightening side.

In an embodiment, each of the first spacers may be mounted on each of the first bolts, and each of the first nuts may be mounted on the respective each of the first bolts on the respective each of the first spacers and may be respectively tightened 650. Similarly, each of the second spacers may be mounted on each of the second bolts, and each of the second nuts may be mounted on the respective each of the second bolts 410 on the respective each of the second spacers and the second nuts may be respectively tightened 750.

Some advantages relating to the various aspects and/or embodiments described as follows. Flange connection may be optimised. The distance between bolt connections may be reduced. The constraint on number of bolt connections in a tower flange connection by the dimension of the tool to mount or torque tighten the bolt connections may be reduced or overcame. The distance between bolts may no longer be driven or limited by tool dimension. Flange connection may accommodate a larger number of bolt connections. The load capacity of the tower flange connection may no longer be driven or limited by the number of bolt connections in the flange connection. Flange connection may be able to support higher loads. Tower diameter may remain the same while supporting higher loads. Bigger turbines may be installed without changing or increasing the tower diameter. A more efficient transportation of wind turbines may be achieved. A more efficient and/or powerful wind turbine may be provided.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A tower section of a wind turbine, the tower section comprising:
    an upper segment comprising a lower flange;
    a lower segment comprising an upper flange;
    a plurality of first bolt connections comprising first bolts and first nuts; and
    a plurality of second bolt connections comprising second bolts and second nuts;
    wherein the first bolt connections and the second bolt connections connect the lower flange to the upper flange; and,
    wherein the first bolts and the second bolts have different axial positions with respect to the longitudinal axis of the tower section,
    wherein the first bolts are substantially parallel to the second bolts, and
    wherein a separation distance separating one of the plurality of first bolt connections and one of the plurality of second bolt connections is less than a distance required for a tool to tighten the at least one of the plurality of first bolt connections and second bolt connections in a single plane.

2. The tower section of claim 1, wherein the upper flange and the lower flange each comprise a plurality of bolt-holes for the plurality of first bolt connections and the plurality of second bolt connections.

3. The tower section of claim 1, wherein the upper flange and the lower flange are made of metal.

4. The tower section of claim 1, wherein each of the plurality of first bolt connections and the plurality of second bolt connections comprises at least 30% of all bolt connections connecting the lower flange to the upper flange, respectively.

5. The tower section of claim 1, wherein the first bolt connections are mounted in a first direction and the second bolt connections are mounted in a second direction, wherein the first direction is different from the second direction.

6. The tower section of claim 1, wherein the plurality of first bolt connections comprises first spacers and the plurality of second bolt connections comprises second spacers, and wherein the first spacers have axial lengths at least equal to a thickness of a head portion of one of the second bolts, and the second spacers have axial lengths at least equal to a thickness of a head portion of one of the first bolts.

7. The tower section of claim 1, wherein the upper segment is a part of a yaw gearing, and/or wherein the lower segment is a part of a foundation segment.

8. A method for connecting a lower segment to an upper segment of a tower section of a wind turbine, wherein the upper segment comprises a lower flange and the lower segment comprises an upper flange, the method comprising:
    mounting a plurality of first bolts and a plurality of first nuts to build a plurality of first bolt connections connecting the lower flange to the upper flange; and,
    mounting a plurality of second bolts and a plurality of second nuts to build a plurality of second bolt connections connecting the lower flange to the upper flange;
    wherein the first bolts and the second bolts have different axial positions with respect to the longitudinal axis of the tower section,
    wherein the first bolts are substantially parallel to the second bolts, and
    wherein a separation distance separating one of the plurality of first bolt connections and one of the plurality of second bolt connections is less than a distance required for a tool to tighten the at least one of the plurality of first bolt connections and second bolt connections in a single plane.

9. The tower section of claim 8, further comprising:
    tightening the plurality of first bolt connections from a side above the lower flange; and
    tightening the plurality of the second bolt connections from a side below the upper flange.

10. The tower section of claim 8, wherein:
    mounting the plurality of first bolts and the plurality of first nuts comprises mounting a plurality of first spacers on the plurality of first bolts from a side above the lower flange; and, mounting the plurality of second bolts and the plurality of second nuts comprises mounting a plurality of second spacers on the plurality of second bolts from a side below the upper flange.

* * * * *